(12) United States Patent
Yu

(10) Patent No.: US 11,111,087 B1
(45) Date of Patent: Sep. 7, 2021

(54) TRANSFER SYSTEM FOR SOFT GELS

(71) Applicant: Xiongqing Yu, Diamond Bar, CA (US)

(72) Inventor: Xiongqing Yu, Diamond Bar, CA (US)

( * ) Notice: Subject to any disclaimer, the term of this patent is extended or adjusted under 35 U.S.C. 154(b) by 0 days.

(21) Appl. No.: 17/003,917

(22) Filed: Aug. 26, 2020

(51) Int. Cl.
| | | |
|---|---|---|
| *B65G 53/14* | (2006.01) | |
| *B65G 53/18* | (2006.01) | |
| *B65G 53/36* | (2006.01) | |
| *B65G 69/20* | (2006.01) | |
| *B65G 3/04* | (2006.01) | |
| *B65G 53/40* | (2006.01) | |

(52) U.S. Cl.
CPC .............. *B65G 53/18* (2013.01); *B65G 3/04* (2013.01); *B65G 53/36* (2013.01); *B65G 69/20* (2013.01); *B65G 53/40* (2013.01); *B65G 2201/027* (2013.01)

(58) Field of Classification Search
CPC ........ B65G 53/14; B65G 53/36; B65G 53/40; B65G 53/50; B65G 69/20; B65G 2201/027; B65G 2812/1633; B65D 88/548; B01F 5/0413; F25D 25/04
USPC .................................. 406/12, 29, 89, 92, 144
See application file for complete search history.

(56) References Cited

U.S. PATENT DOCUMENTS

| | | | | |
|---|---|---|---|---|
| 2,391,863 A | * | 1/1946 | Bowen | B04C 3/04 96/372 |
| 2,919,160 A | * | 12/1959 | Blackburn | B65G 53/22 406/85 |
| 3,206,255 A | * | 9/1965 | Gray | B65G 53/00 406/93 |
| 3,237,805 A | * | 3/1966 | Stogner | G01F 13/001 406/130 |
| 3,490,654 A | * | 1/1970 | Fischer | B65G 53/66 406/123 |
| 3,527,413 A | * | 9/1970 | Crowther | B65G 53/06 241/12 |
| 3,708,208 A | * | 1/1973 | Fuss | B65G 53/06 406/144 |
| 3,746,254 A | * | 7/1973 | Duncan | B05B 5/1683 239/697 |
| 3,804,303 A | * | 4/1974 | Fassauer | B65G 69/20 406/71 |
| 3,809,438 A | * | 5/1974 | Hubbard | B65G 53/60 406/106 |
| 3,856,459 A | * | 12/1974 | Bourton | B65G 69/20 432/58 |

(Continued)

*Primary Examiner* — Joseph A Dillon, Jr.
(74) *Attorney, Agent, or Firm* — Tommy SF Wang; Wang IP Law Group, P.C.

(57) ABSTRACT

A transfer system for soft gels is disclosed. It comprises: a blower, having a first air inlet and a first air outlet, and generating an airflow by inhaling air from the first air inlet and discharging air out of the first air outlet; a hopper, having a top opening to catch soft gels manufactured and dropped directly from a soft gel machine and a bottom opening to drop the soft gels; a transfer hose, having a first opening connected to the first air outlet and a second opening, wherein a side-cut opening is formed to connect to the bottom opening, the airflow from the first opening blows the soft gels dropped at the side-cut opening to move the soft gels toward the second opening; a cooling module, having a second air inlet and a second air outlet, cooling down the external air from the second air inlet and discharging the cooled air from the second air outlet; and a connecting hose, connecting the second air outlet and the first air inlet.

19 Claims, 10 Drawing Sheets

(56) References Cited

U.S. PATENT DOCUMENTS

| | | | | |
|---|---|---|---|---|
| 4,049,405 A * | 9/1977 | Goldsmith | ............ | B01D 53/02 55/479 |
| 4,111,492 A * | 9/1978 | Mraz | ............ | B65G 53/14 222/144.5 |
| 4,127,397 A * | 11/1978 | O'Nan, Jr. | ............ | G21F 9/00 55/479 |
| 4,183,702 A * | 1/1980 | Bonnel | ............ | B65G 53/18 406/56 |
| 4,697,962 A * | 10/1987 | Dunbar | ............ | B65G 53/12 406/15 |
| 4,846,608 A * | 7/1989 | Sanders | ............ | B65G 53/14 406/144 |
| 5,323,819 A * | 6/1994 | Shade | ............ | B65B 39/001 141/18 |
| 5,494,381 A * | 2/1996 | Heyl | ............ | B65G 53/12 406/14 |
| 5,749,683 A * | 5/1998 | Kunse | ............ | B60P 1/60 406/154 |
| 5,765,728 A * | 6/1998 | Simpson | ............ | B01J 8/002 222/146.2 |
| 6,892,909 B1 * | 5/2005 | Hebert | ............ | A01C 7/081 111/174 |
| 7,144,204 B2 * | 12/2006 | Hilgraf | ............ | B65G 53/20 406/95 |
| 7,337,992 B1 * | 3/2008 | Blatt | ............ | A01C 15/04 222/637 |
| 7,597,506 B2 * | 10/2009 | Snowdon | ............ | B65D 88/128 406/122 |
| 8,061,295 B2 * | 11/2011 | Zimmerman | ............ | E01C 23/166 118/308 |
| 8,113,745 B2 * | 2/2012 | Aoki | ............ | B65G 53/525 406/197 |
| 8,622,660 B1 * | 1/2014 | Gore | ............ | A01K 5/0208 406/41 |
| 8,747,029 B2 * | 6/2014 | Thorn | ............ | G05D 7/0688 406/197 |
| 8,905,681 B2 * | 12/2014 | Schneider | ............ | B65G 53/06 406/156 |
| 2001/0041103 A1 * | 11/2001 | Pfeiffer | ............ | B65G 53/14 406/144 |
| 2003/0002926 A1 * | 1/2003 | Webb | ............ | B65G 53/14 406/191 |
| 2003/0133759 A1 * | 7/2003 | Winther | ............ | A01C 7/082 406/138 |
| 2005/0199543 A1 * | 9/2005 | Burcham | ............ | B65G 53/521 210/459 |
| 2010/0219543 A1 * | 9/2010 | Zazula | ............ | A61J 3/07 264/4.4 |
| 2011/0210185 A1 * | 9/2011 | Lundstrom | ............ | B65G 53/30 239/9 |
| 2012/0049410 A1 * | 3/2012 | Altamar | ............ | A61K 9/4866 264/294 |

* cited by examiner

TRANSFER SYSTEM FOR SOFT GELS

FIELD OF THE INVENTION

The present invention relates to a transfer system. More particularly, the present invention relates to a transfer system for soft gels applied to a soft gel manufacturing machine to transfer soft gels with cool air to a dryer or any desired location.

BACKGROUND OF THE INVENTION

Soft gels and capsules are both edible packages for medicines and nutritional food. Different from capsules, soft gels have oral outward appearance and consist of a gelatin-based shell surrounding a stuffing. Since soft gel are very tiny and need mass production, a suitable automatic manufacturing machine is required.

An automatic manufacturing machine for soft gels is illustrated in FIG. 1. Softened or melted gelatin (or other material) is provided from two transfer tubes 1 with higher temperature showing by arrows. The gelatin is fed to separate extrusion die 2 and becomes flat film G. The flat films G in two ways are further redirected by two rollers 3 and then formed as soft gels S by two rotary dies 4 which are injected with medicine by a pump assembly 5. The soft gels are fallen by gravity to a collection bucket 6 or a conveyor for next process. A problem is that the soft gels are still hot, so that they may be stuck to each other or to any surface they pass by. Thus, the yield rate may be reduced. More critically, the automatic manufacturing machine or other machine in the next process must be shut down to clean the stuck soft gels. Therefore, a solution for settling this problem is desired.

Obviously, a good means is to cool down the temperature of the flat film G or the soft gels S somewhere during the production process. US patent application No. 20100219543 provides a system for cooling a hot-filled soft gel capsule. Simply speaking, the patent application modifies the rollers 3 of the automatic manufacturing machine in FIG. 1. A cooling roller is designed and used to cool down the temperature of the flat films G before they are further molded. This improvement may lead to reduction of elasticity of the flat film G and tiny crack on the surface of the soft gels S. Another solution is disclosed in US patent application No. 20120049410 with a title of apparatus and process for making soft gel capsules. Please refer to FIG. 1. In this patent application, a chilled liquid 7 is provided to cool down the temperature of the soft gels S before further processing. No matter what the chilled liquid 7 is, an extra step is required to clean the chilled liquid 7. It increases the cost of production.

Therefore, an innovative solution for transferring the soft gels from the manufacturing machine to any desired location is still required.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

A transfer system for soft gels is disclosed. It comprises: a blower, having a first air inlet and a first air outlet, and generating an airflow by inhaling air from the first air inlet and discharging air out of the first air outlet; a hopper, having a top opening to catch soft gels manufactured and dropped directly from a soft gel machine and a bottom opening to drop the soft gels; a transfer hose, having a first opening connected to the first air outlet and a second opening, wherein a side-cut opening is formed to connect to the bottom opening, the airflow from the first opening blows the soft gels dropped at the side-cut opening to move the soft gels toward the second opening; a cooling module, having a second air inlet and a second air outlet, cooling down the external air from the second air inlet and discharging the cooled air from the second air outlet; and a connecting hose, connecting the second air outlet and the first air inlet.

The transfer system for soft gels may further comprises an air filter, configured to the second air inlet, filtering dusts in the external air before entering the second air inlet.

Preferably, the air filter may be a high-efficiency particulate air filter, a pleated air filter or a fiberglass air filter.

The transfer system for soft gels may further comprises a control box, electrically connected to the blower, adjusting the speed of the airflow generated by the blower.

In one embodiment, the control box further comprises: a variable-frequency drive, electrically connected to the blower, adjusting the speed of the airflow generated by the blower by varying Voltage and/or frequency of the power provided to the blower; a power unit, providing power; a housing, accommodating the variable-frequency drive and the power unit; a control interface, mounted on the housing, receiving operating instructions; and a controlling unit, installed in the housing and electrically connected to the control interface, the power unit and the variable-frequency drive, controlling power supply to the control interface and the variable-frequency drive, and operation of the variable-frequency drive by the received operating instructions. The control interface may comprise push buttons, a selector switch, or a touch panel.

In another embodiment, the control box further comprises: a power unit, providing power; a potentiometer, electrically connected to the blower, adjusting the speed of the airflow generated by the blower by Varying voltage of the power provided to the blower; a housing, accommodating the potentiometer and the power unit; and a control interface, mounted on the housing and electrically connected to the power unit and the potentiometer, being operated to adjust a resistor value of the potentiometer to change voltage output from the potentiometer. Preferably, the control interface is a knob.

Preferably, the cooling module may a heat exchanger. A medium of the heat exchanger to exchange heat from the airflow is refrigerant, air or chill water. The cooling module may also be a water-cooled chiller or an air-cooled chiller.

According to the present invention, an angel between the direction the soft gels drops to the side-cut opening and the direction the airflow hits the soft gels ranges from 30° to 60°.

According to the present invention, the hopper may further comprise a hopper lid, rotatably connected to the top opening of the hopper, having at least one cutting opening for the soft gels to pass by and preventing the soft gels from rebounding. The material of the hopper may be 316 stainless steel. The hopper has a long slope segment and a short flat segment at a bottom side, and the bottom opening is formed on a junction thereof. The hopper may further have a side opening to catch soft gels manufactured and dropped from the soft gel machine in a direction not parallel to the direction of gravity. The blower is a centrifugal blower.

Conventional machines transfer soft gels with a conveyor while the present invention uses the force air coming out of the blower with lower temperature to transfer the soft gels from one device to another. Namely, cooling air is sucked by the blower through the cooling module, e.g. a heat exchanger, and blown to the soft gels. It prevents the soft gels from sticking during transferring. Obviously, the present invention has the benefit of separating, soft gels when transferring, further reducing the cost of shutdown of machine to clean stuck soft gels.

DETAILED DESCRIPTION OF THE PREFERRED EMBODIMENTS

The present invention will now be described more specifically with reference to the following embodiments.

Figure 1:
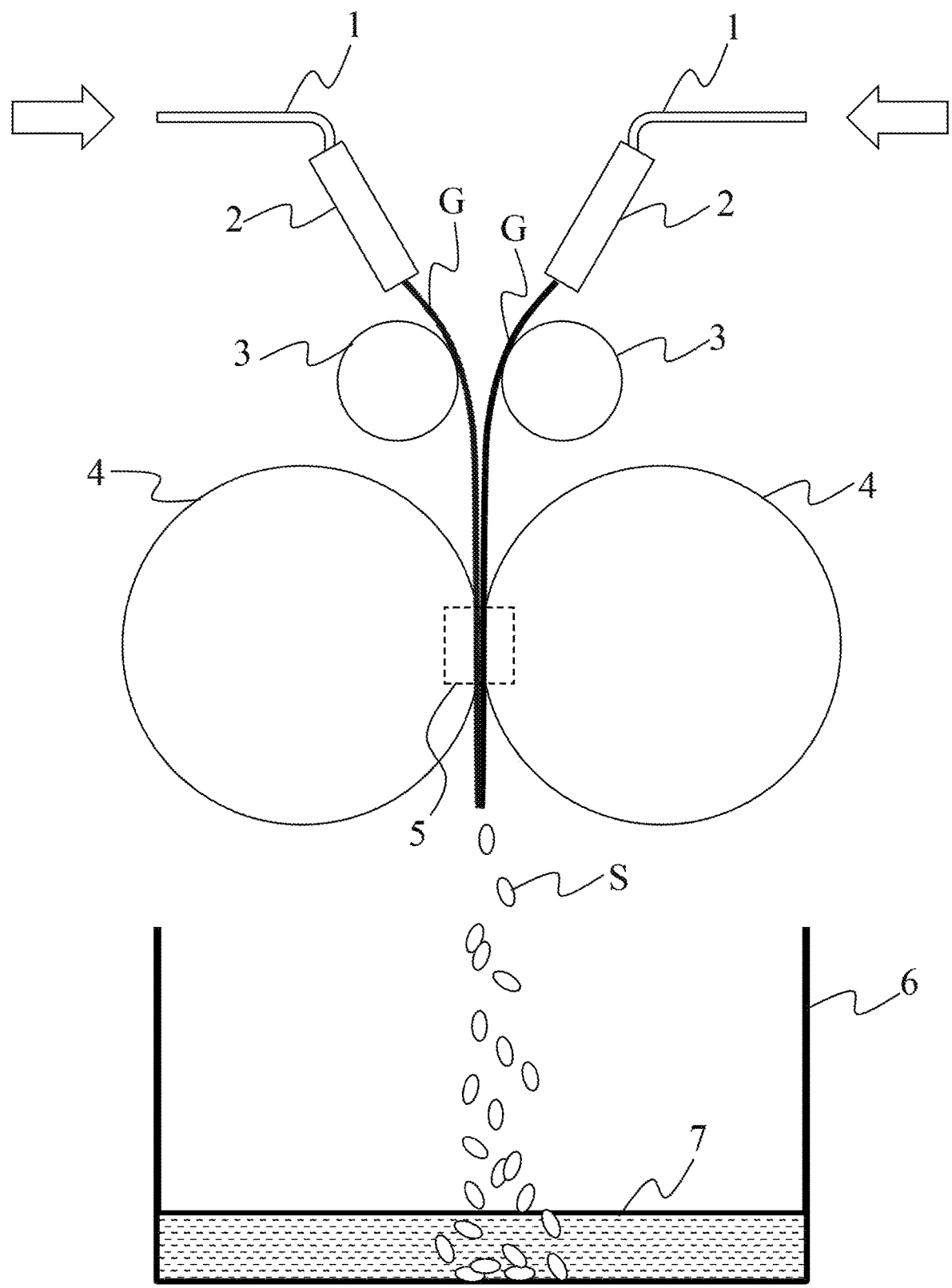
FIG. 1 illustrates a machine for manufacturing soft gels.
Figure 2:
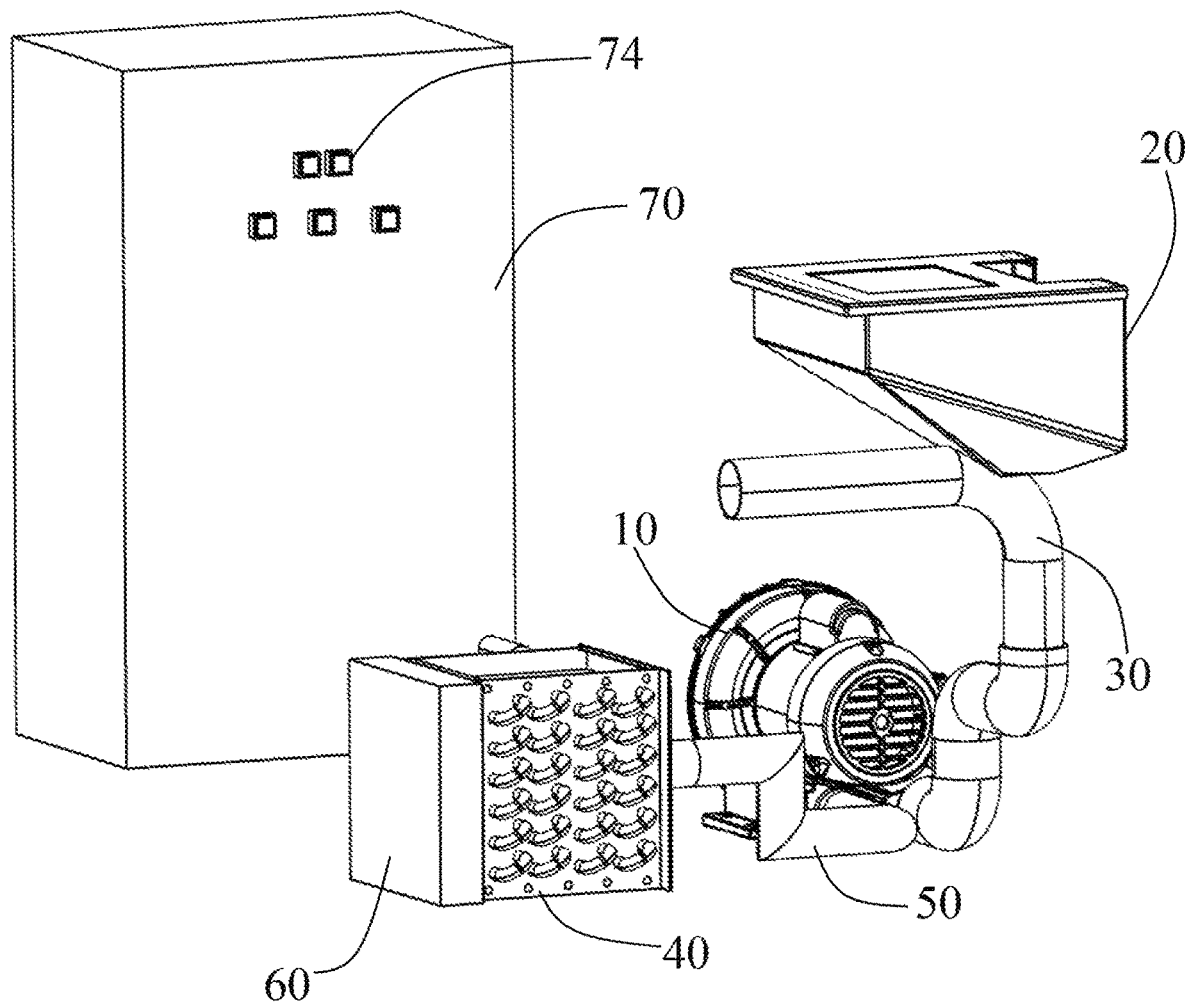
FIG. 2 is a schematic diagram of a transfer system for soft gels according to an embodiment of the present invention.

Please refer to FIG. 2. An embodiment of a transfer system for soft gels is illustrated. The transfer system for soft gels comprises a blower 10, a hopper 20, a transfer hose 30, a cooling module 40, a connecting hose 50, an air filter 60 and a control box 70. Structure and functions of the technical components, and interactions with other components will be illustrated in detail below.

Figure 3:
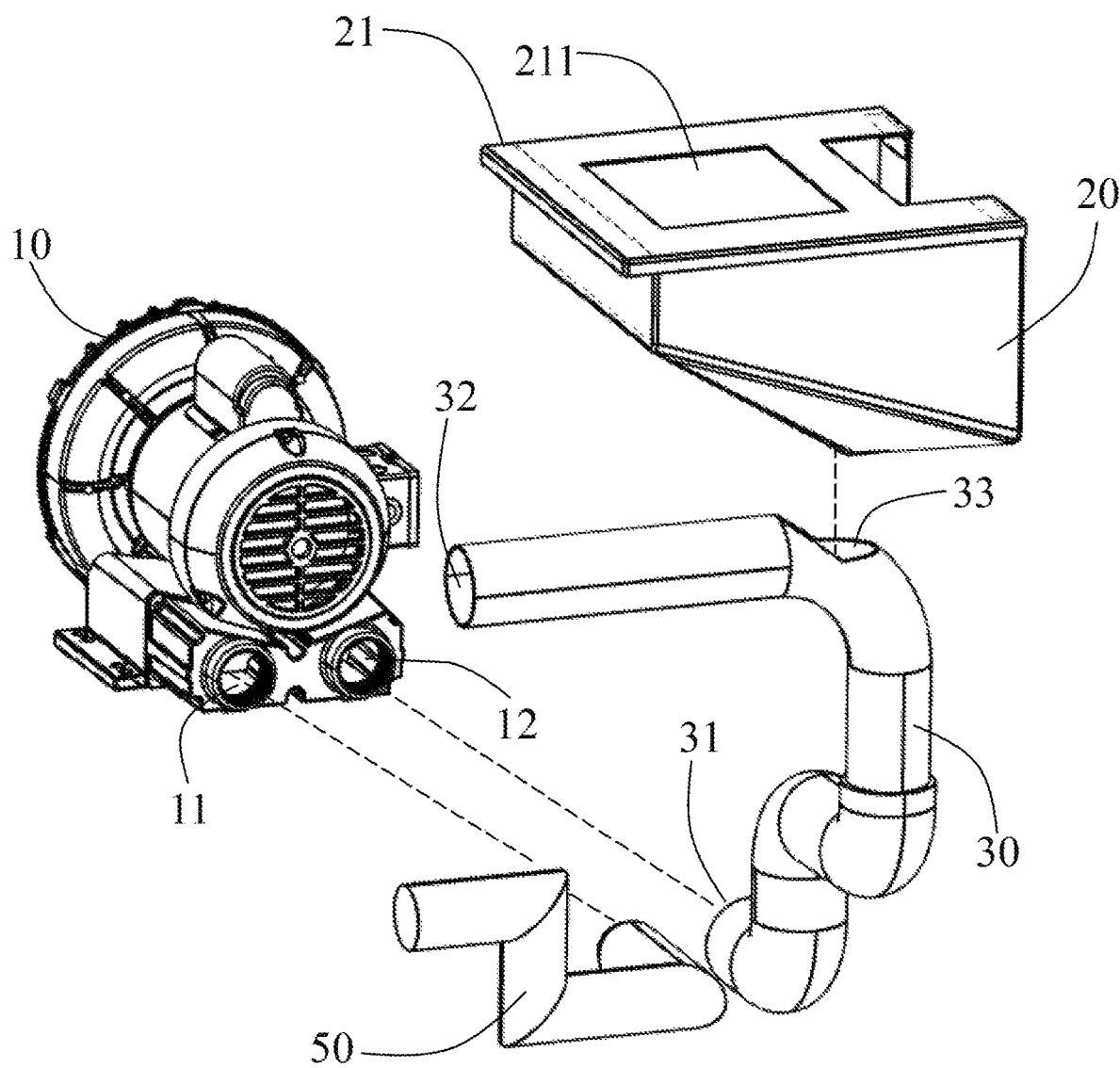
FIG. 3 is a partial exploded view of the transfer system for soft gels.

Please refer to FIG. 3. It is a partial exploded view of the transfer system for soft gels with the blower 10, the hopper 20, the transfer hose 30 and the connecting hose 50. The blower 10 is the main device to drive the airflow in the transfer hose 30 and the connecting hose 50. In this embodiment, the blower 10 is a centrifugal blower. The advantage is that the airflow does not pass through the motor shaft, so that the transfer hose 30 and the connecting hose 50 can keep clean. The blower 10 has a first air inlet 11 and a first air outlet 12. When the blower 10 is turned on, it generates the airflow by inhaling air from the first air inlet 11 and discharging air out of the first air outlet 12.

Figure 4:
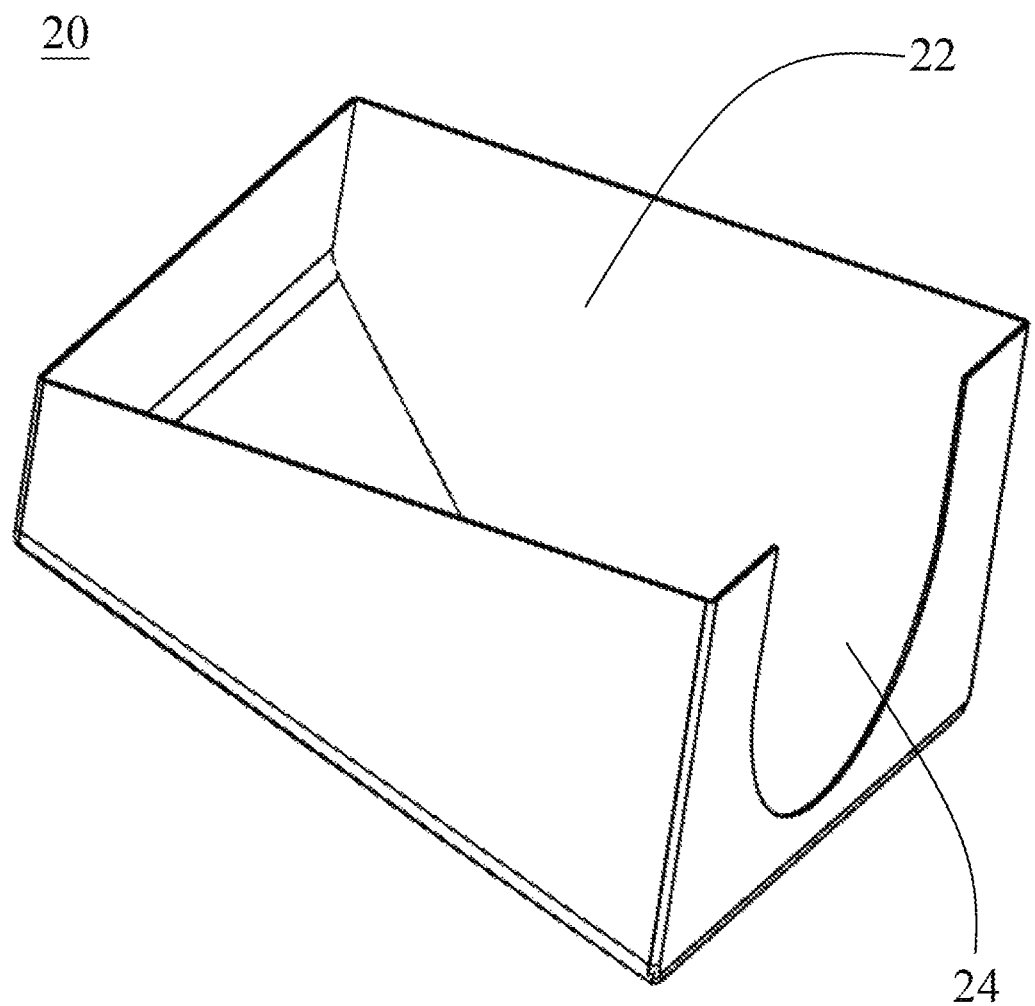
FIG. 4 is a schematic diagram of appearance of a hopper.
Figure 5:
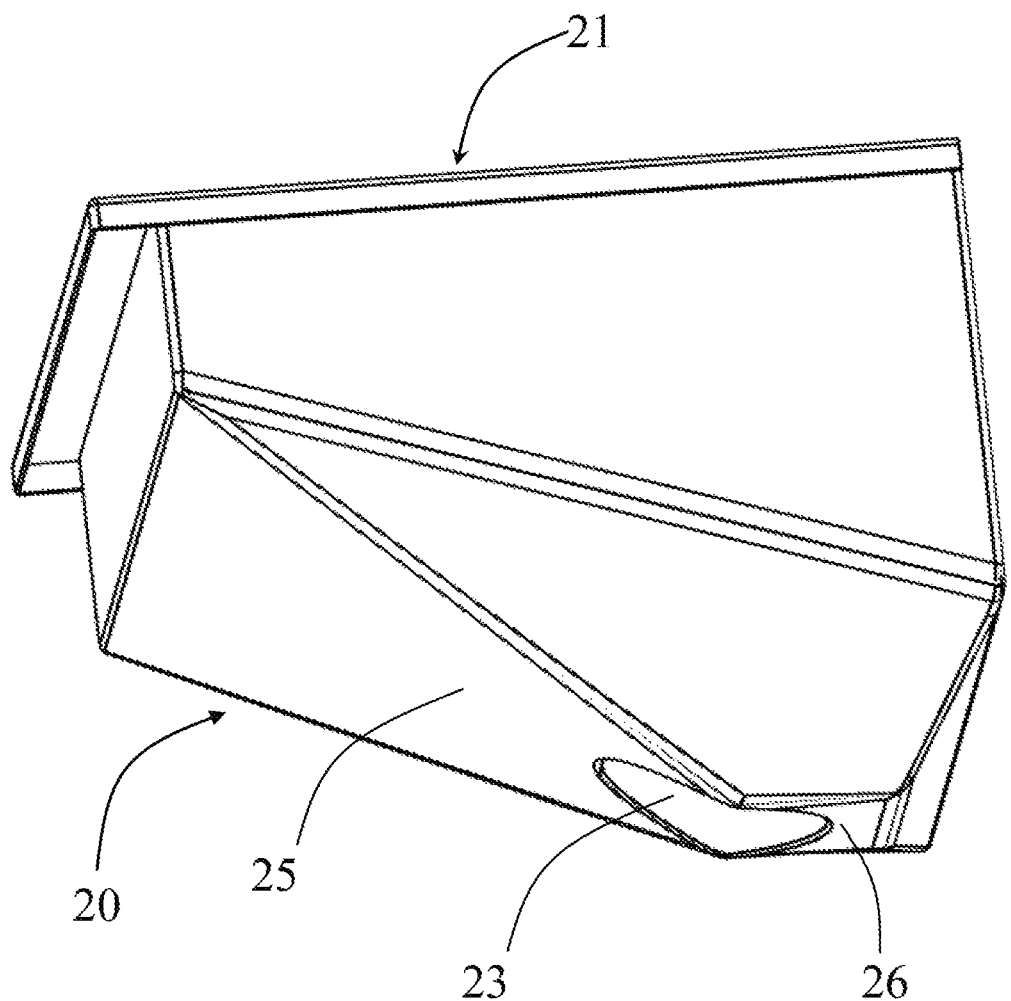
FIG. 5 is another schematic diagram of appearance of the hopper with a hopper lid.

Please see FIG. 4 and FIG. 5. FIG. 4 is a schematic diagram of appearance of the hopper 20. FIG. 5 is another schematic diagram of appearance of the hopper 20 with a hopper lid 21.

The hopper 20 has a top opening 22 a bottom opening 23 and a side opening 24. The top opening 22 is used to catch soft gels manufactured and dropped directly from a soft gel machine (not shown). The soft gels move only due to gravity. If the soft gel machine blows the manufactured soft gels out from itself or uses a smooth steel plate to direct the soft gels to a direction not parallel to the direction of the gravity, the side opening 24 can catch those soft gels from one side. The bottom opening 23 drops the soft gels to the transfer hose 30.

The hopper lid 21 is rotatably connected to the top opening 22 of the hopper 20 (may be by hinges). The hopper lid 21 has at least one cutting opening 211. The cutting opening 211 allows the soft gels to pass by from the soft gel machine from the top side and prevents the soft gels from rebounding out of the hopper 20. Since the hopper 20 can catch the soft gels from different sides, a shape of the hopper 20 can not be axisymmetric. As shown in FIG. 5, the hopper 20 has a long slope segment 25 and a short flat segment 26 at a bottom side. The bottom opening 23 is formed on a junction of the long slope segment 25 and the short flat segment 26. The location of the bottom opening 23 may also on the short flat segment 26 only. It depends on how the hopper 20 is connected to the transfer hose 30. In order not to be stuck by the hot soft gels, the hopper 20 is better to be made of smooth metal plate, e.g. 316 stainless steel.

The transfer hose 30 has a first opening 31 connected to the first air outlet 12 and a second opening 32. Meanwhile, a side-cut opening 33 is formed on the transfer hose 30 to connect to the bottom opening 23 of the hopper 20. The airflow from the first opening 31 (first air outlet 12) blows the soft gels dropped at the side-cut opening 33 to move the soft gels toward the second opening 32. The second opening 32 is further connected to another machine, such as a dryer, for other process, so that the soft gels can be guided to the machine as well. The second opening 32 can also not be confined. The soft gels can thus be delivered to any desired location.

Figure 6:
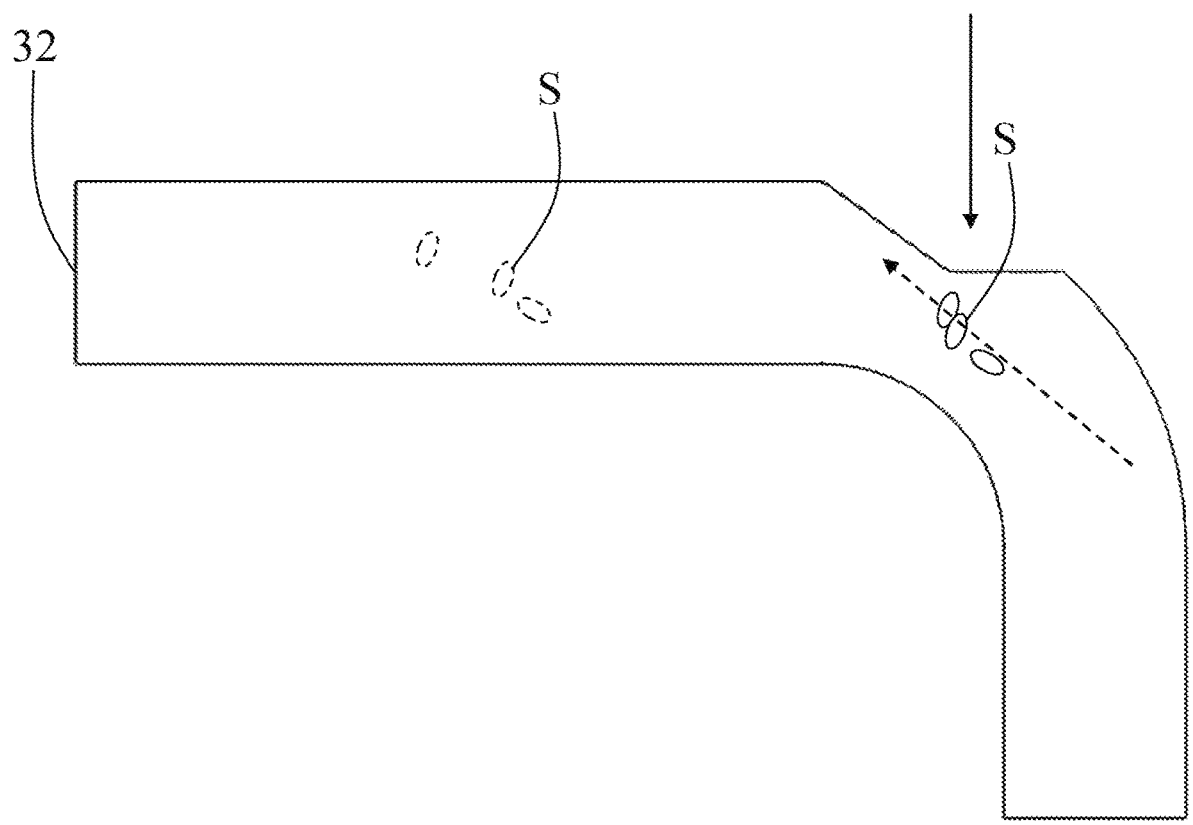
FIG. 6 is a sectional view of a transfer hose with soft gels transferred by the airflow.

It should be emphasized that although the transfer hose 30 can be designed as any shape, with desired angle, the transfer hose 30 can not be connected to the hopper 20 at a vertical segment. If so, the airflow directly hits the soft gels in an opposite direction but is not able to move the soft gels to desired direction. Please see FIG. 6. It is a sectional view of the transfer hose 30 with soft gels S transferred by the airflow. The soft gels S fall from the side-cut opening 33 along the direction of a solid arrow line due to gravity. The airflow hits the soft gels S along a direction of a dashed arrow line. A horizontal component of the force of the airflow pushes the soft gels S to move to the second opening 32 (from the location where the soft gels S are marked by solid oval to another place where soft gels S are marked by dashed oval). A vertical component of the force of the airflow can disperse the stuck soft gels S. Preferably, an angel between the direction the soft gels S drops to the side-cut opening 33 and the direction the airflow hits the soft gels S may range from 30 to 60. Accordingly, the side-cut opening 33 should be formed on a curve part of the transfer hose 30 as shown in FIG. 6.

Figure 7:
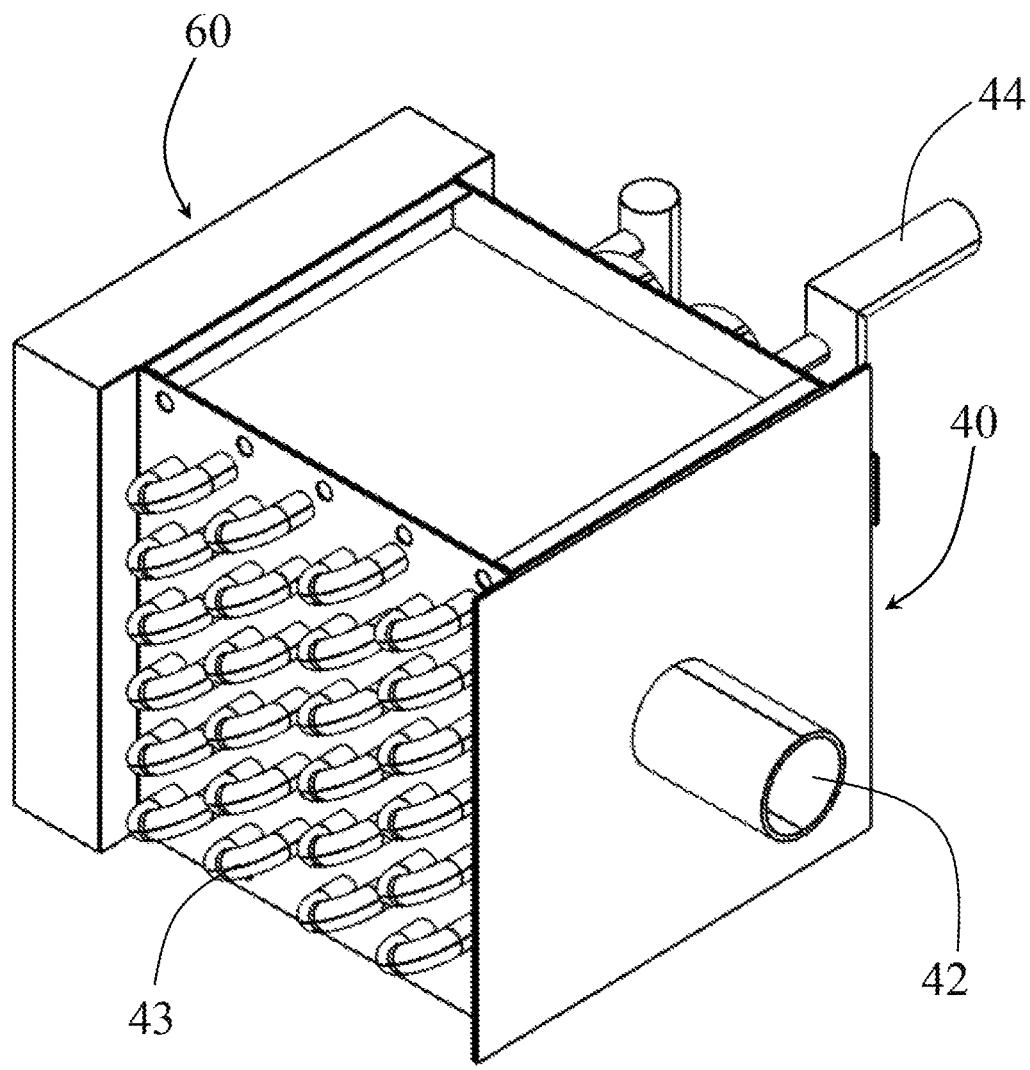
FIG. 7 is a schematic diagram of appearance of a cooling module connected with an air filter.
Figure 8:
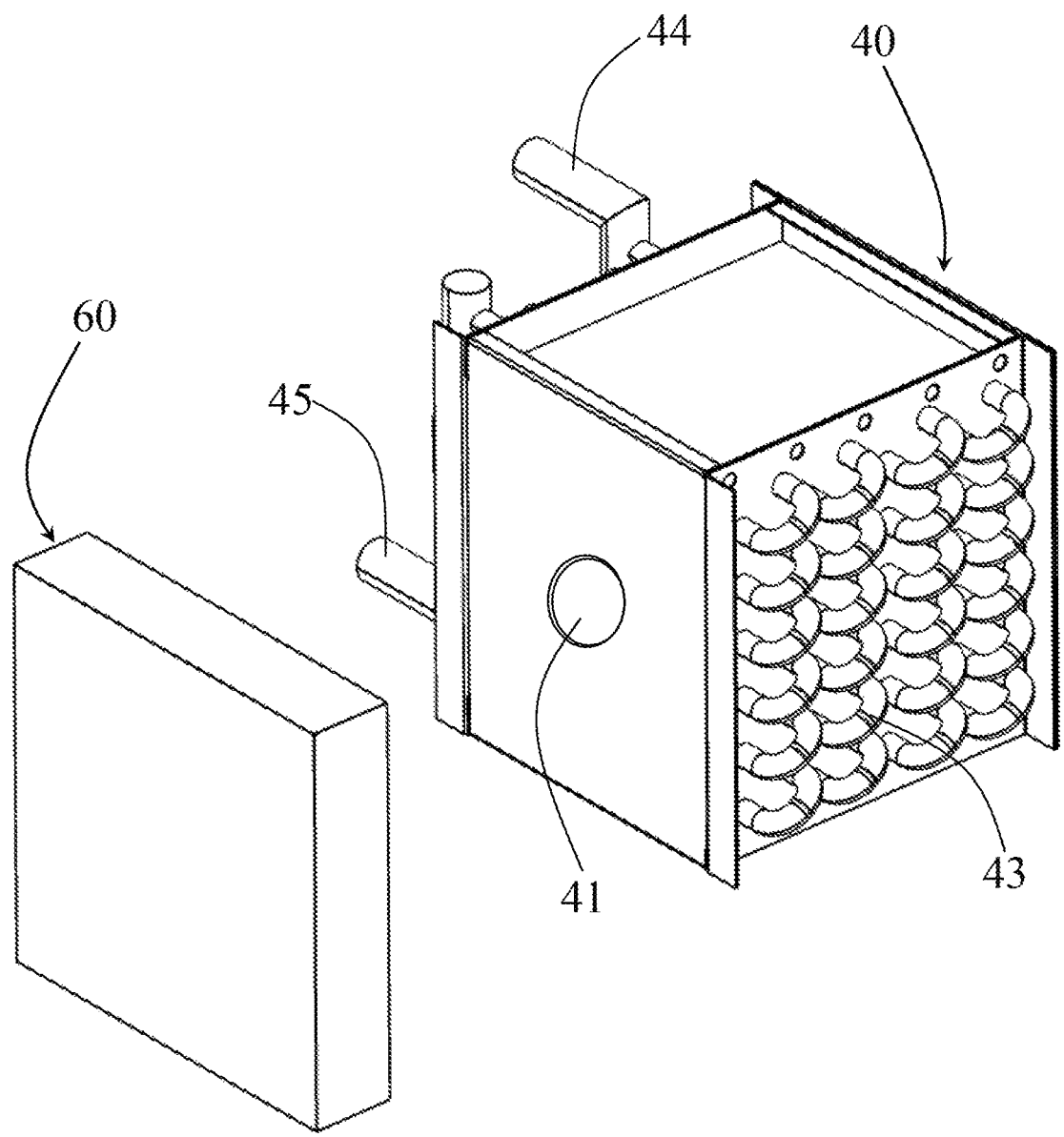
FIG. 8 is another schematic diagram of appearance of the cooling module separated from the air filter.

Please refer to FIG. 7 and FIG. 8. FIG. 7 is a schematic diagram of appearance of the cooling module 40 connected with the air filter 60. FIG. 8 is another schematic diagram of appearance of the cooling module 40 separated from the air filter 60. The cooling module 40 has a second air inlet 41 and a second air outlet 42. The function of the cooling module 40 is to cool down the external air from the second air inlet 41 and discharge the cooled air from the second air outlet 42. In this embodiment, the cooling module 40 is a heat exchanger. The first air inlet 11 into the blower 10 sucks cool air through the heat exchanger (cooling module 40) and blows the cool air through the first air outlet 12 while transferring the soft gels. In some application, the same structure may be used for transferring capsules from a capsule manufacturing machine. A medium of the heat exchanger to exchange heat from the airflow may be, but not limited to, refrigerant, air, or chili water. The medium runs in a closed loop of chilling tubes 43 inside the heat exchanger while the external air flows through the chilling tube 43. The air is cooled down by dissipating its heat to the chilling tubes 43 and the heat is taken away by the medium. The medium can be further transferred to a cooler (not shown) from an outlet 44 and cool medium from the cooler can come back to the closed loop of chilling tubes 43 from an inlet 45. In other embodiments, the cooling module 40 can even be a standalone water-cooled chiller or air-cooled chiller.

The connecting hose 50 connects the second air outlet 42 of the cooling module 40 and the first air inlet 11 of the blower 10. It ensures the cooled air can be provided to (inhaled by) the blower 10.

The air filter 60 is configured to the second air inlet 41 of the cooling module 40. The air filter 60 filters dusts in the external air before the air enters the second air inlet 41. It keeps the air in the transfer system for soft gels clean, preventing the soft gels from getting dusty. In this embodiment, a high-efficiency particulate air filter is applied. In other embodiments, the air filter 60 may be a pleated air filter or a fiberglass air filter.

The control box 70 is electrically connected to the blower 10 to adjust the speed of the airflow generated by the blower 10 (the speed of a motor of the blower 10). According to the present invention, the control box 70 can be automatic control or manual control. Different designs of the control box 70 are disclosed below in two embodiments below.

Figure 9:
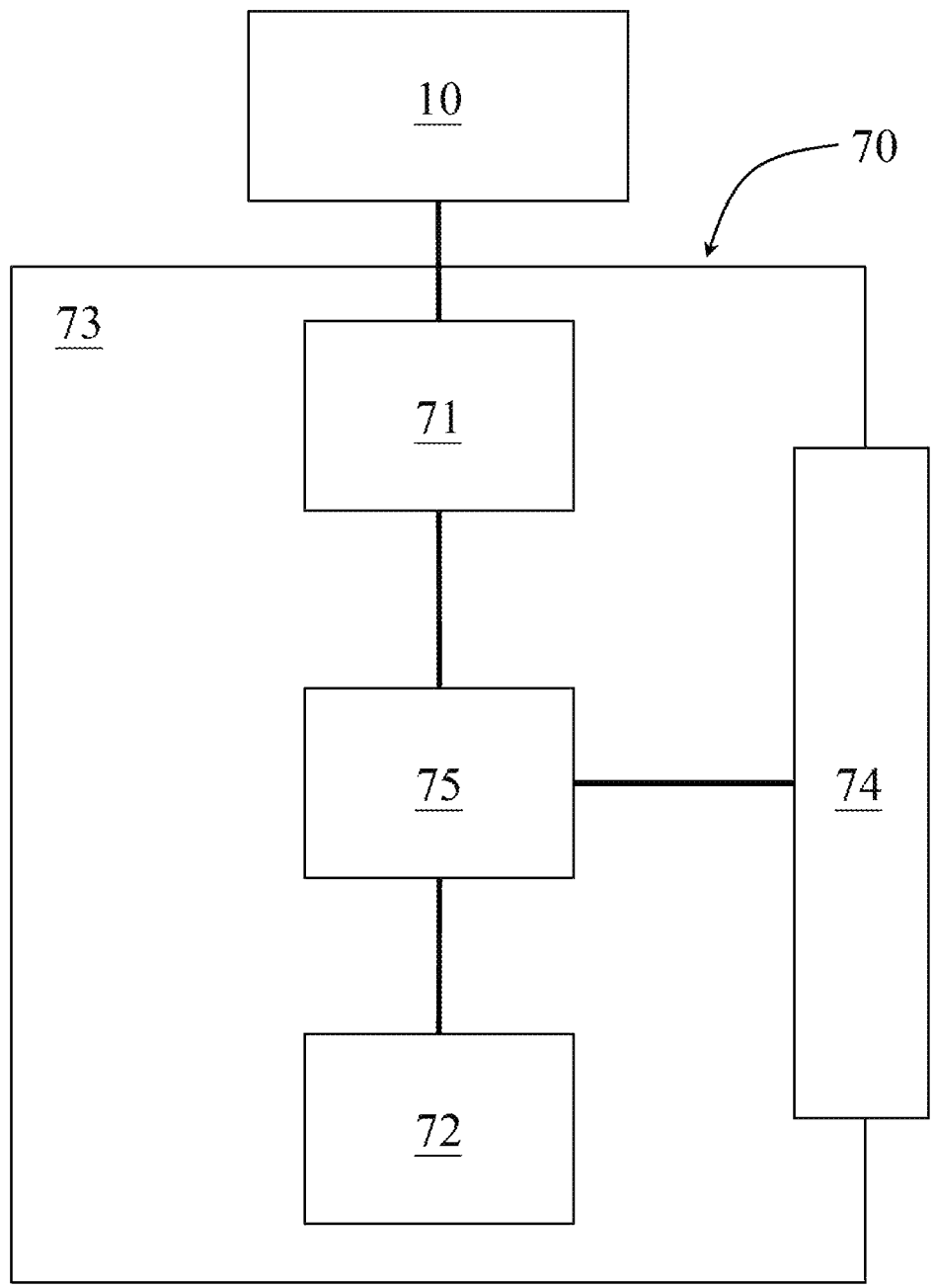
FIG. 9 is a block diagram of the control box.

Please see FIG. 9. It is a block diagram of the control box 70. In one embodiment, the control box 70 comprises a variable-frequency drive 71, a power unit 72, a housing 73, a control interface 74 and a controlling unit 75. The variable-frequency drive 71 is electrically connected to the blower 10. The variable-frequency drive 71 works to adjust the speed of the airflow generated by the blower 10 by varying voltage and/or frequency of the power provided to the blower 10. The power unit 72 provides power for operating the control box 70. It can be an AC power source or a DC power source depending on the power the blower 10 needs. However, the power unit 72 does not provide power to the blower 10 directly. The housing 73 accommodates the variable-frequency drive 71 and the power unit 72 to protect them from damages. The control interface 74 is mounted on the housing 73 to receive operating instructions. It means different status of the control interface 74 represents different operating instructions. In this embodiment, the control interface 74 comprises several push buttons. One push button may be used to initiate the control box 70 (power unit 72), one push button may be used to run the blower 10 at a high level, one push button may be used to run the blower 10 at a low level, etc. The control interface 74 may also comprise a selector switch or a touch panel in other embodiments. The controlling unit 75 is installed in the housing 73 and electrically connected to the control interface 74, the power unit 72 and the variable-frequency drive 71. The controlling unit 75 controls power supply to the control interface 74 and the variable-frequency drive 71 from the power unit 72. Meanwhile, the controlling unit 75 also controls the operation of the variable-frequency drive 71 by the received operating instructions. Thus, the variable-frequency drive 71 can output power to the blower 10 with desired voltage and/or frequency to adjust the speed of the airflow generated by the blower 10. In this embodiment, the control box 70 is automatic control.

Figure 10:
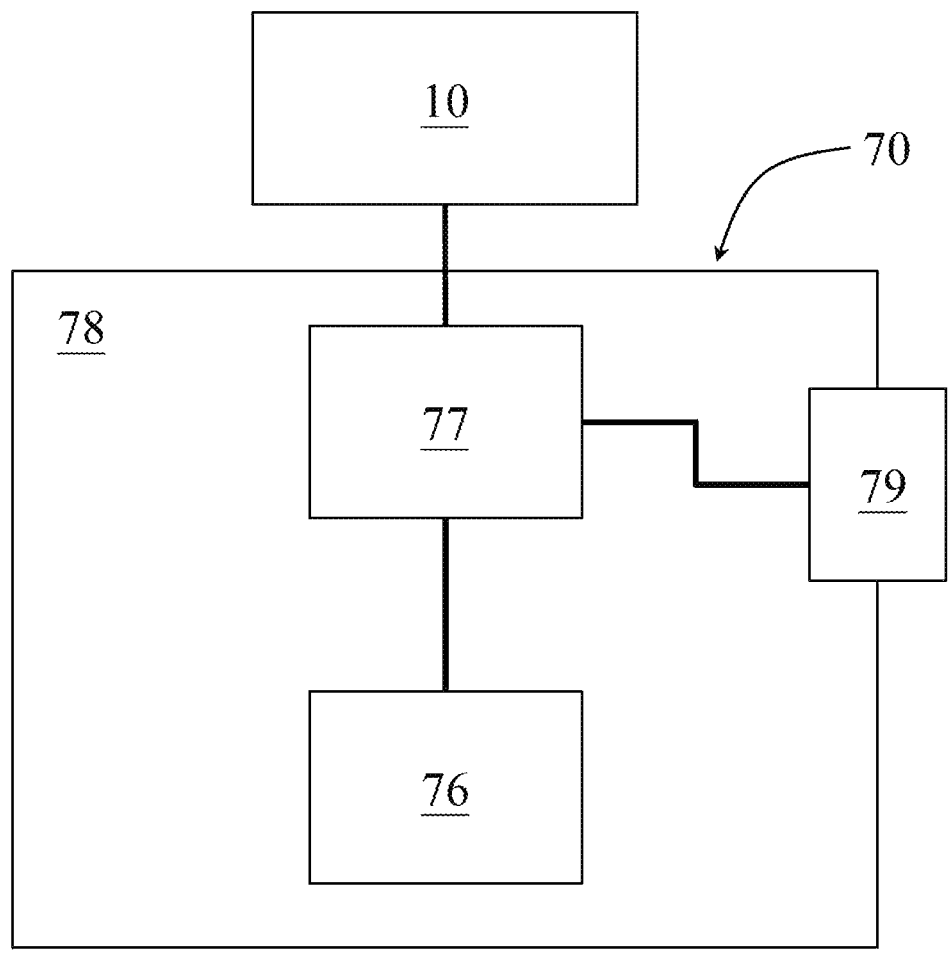
FIG. 10 is another block diagram of the control box.

Please see FIG. 10. It is another block diagram of the control box 70. In this embodiment, the control box 70 comprises a power unit 76, a potentiometer 77, a housing 78 and a control interface 79. The power unit 76 is just like the power unit 72. Its job is to provide desired power. The potentiometer 77 is electrically connected to the blower 10. Different rotational positions lead to different resistor values of the potentiometer 77. Therefore, the potentiometer 77 can adjust the speed of the airflow generated by the blower 10 by varying voltage of the power provided to the blower 10 due to the same current goes through the potentiometer 77 under different resistor values. The housing 78 accommodates the potentiometer 77 and the power unit 76 to protect them from damages. The control interface 79 is mounted on the housing 78 and electrically connected to the power unit 76 and the potentiometer 77. The control interface 79 is operated (turned by hand) to adjust a resistor value of the potentiometer 77 to change voltage output from the potentiometer 77, In practice, the control interface 79 is a knob. In this embodiment, the control box 70 is manual control.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A transfer system for soft gels, comprising:
 a blower, having a first air inlet and a first air outlet, and generating an airflow by inhaling air from the first air inlet and discharging air out of the first air outlet;
 a hopper, having a top opening to catch soft gels manufactured and dropped directly from a soft gel machine and a bottom opening to drop the soft gels;
 a transfer hose, having a first opening connected to the first air outlet and a second opening, wherein a side-cut opening is formed to connect to the bottom opening, the airflow from the first opening blows the soft gels dropped at the side-cut opening to move the soft gels toward the second opening, wherein an angel between a direction the soft gels dropped to the side-cut opening and a direction the airflow hits the soft gels ranges from 30° to 60°;
 a cooling module, having a second air inlet and a second air outlet, cooling down the external air from the second air inlet and discharging the cooled air from the second air outlet; and
 a connecting hose, connecting the second air outlet and the first air inlet.

2. The transfer system for soft gels according to claim 1, further comprising an air filter, configured to the second air inlet, filtering dusts in the external air before entering the second air inlet.

3. The transfer system for soft gels according to claim 2, wherein the air filter is a high-efficiency particulate air filter.

4. The transfer system for soft gels according to claim 2, wherein the air filter is a pleated air filter.

5. The transfer system for soft gels according to claim 2, wherein the air filter is a fiberglass air filter.

6. The transfer system for soft gels according to claim 1, further comprising a control box, electrically connected to the blower, adjusting the speed of the airflow generated by the blower.

7. The transfer system for soft gels according to claim 6, wherein the control box further comprises:
 a variable-frequency drive, electrically connected to the blower, adjusting the speed of the airflow generated by the blower, by varying voltage and/or frequency of the power provided to the blower;

a power unit, providing power;

a housing, accommodating the variable-frequency drive and the power unit;

a control interface, mounted on the housing; receiving operating instructions; and a controlling unit, installed in the housing and electrically connected to the control interface, the power unit and the variable-frequency drive, controlling power supply to the control interface and the variable-frequency drive, and operation of the variable-frequency drive by the received operating instructions.

8. The transfer system for soft gels according to claim 7, wherein the control interface comprises push buttons, a selector switch, or a touch panel.

9. The transfer system for soft gels according to claim 6, wherein the control box further comprises:

a power unit, providing power;

a potentiometer, electrically connected to the blower, adjusting the speed of the airflow generated by the blower by varying voltage of the power provided to the blower;

a housing, accommodating the potentiometer and the power unit; and a control interface, mounted on the housing and electrically connected to the power unit and the potentiometer, being operated to adjust a resistor value of the potentiometer to change voltage output from the potentiometer.

10. The transfer system for soft gels according to claim 9, wherein the control interface is a knob.

11. The transfer system for soft gels according to claim 1, wherein the cooling module is a heat exchanger.

12. The transfer system for soft gels according to claim 1, wherein a medium of the heat exchanger to exchange heat from the airflow is refrigerant, air or chill water.

13. The transfer system for soft gels according to claim 1, wherein the cooling module is a water-cooled chiller.

14. The transfer system for soft gels according to claim 1, wherein the cooling module is an air-cooled chiller.

15. The transfer system for soft gels according to claim 1, wherein the hopper further comprises a hopper lid, rotatably connected to the top opening of the hopper, having at least ono cutting opening for the soft gels to pass by and preventing the soft gels from rebounding.

16. The transfer system for soft gels according to claim 1, wherein the material of the hopper is 316 stainless steel.

17. The transfer system for soft gels according to claim 1, wherein the blower is a centrifugal blower.

18. The transfer system for soft gels according to claim 1, wherein the hopper has a long slope segment and a short flat segment at a bottom side, and the bottom opening is formed on a junction thereof.

19. The transfer system for soft gels according to claim 1, wherein the hopper further has a side opening to catch soft gels manufactured and dropped from the soft gel machine in a direction not parallel to the direction of gravity.

* * * * *